United States Patent [19]

Binon et al.

[11] 3,818,035

[45] June 18, 1974

[54] 2[(2-ALKYLBENZO[B] FURAN-3 YL)METHYL]-Δ² IMIDAZOLINE

[75] Inventors: Fernand Binon, Strombeek-Bever; Alex Areschka, Brussels, both of Belgium

[73] Assignee: Labaz, Paris, France

[22] Filed: Jan. 10, 1972

[21] Appl. No.: 216,795

[30] Foreign Application Priority Data

Jan. 27, 1971  Great Britain...................... 3327/71

[52] U.S. Cl. .............................. 260/309.6, 424/273
[51] Int. Cl. ........................................... C09d 49/34
[58] Field of Search ................................. 260/309.6

[56] References Cited
UNITED STATES PATENTS
3,161,653  12/1964  Fruhstorfer et al. ............. 260/309.6

OTHER PUBLICATIONS

Alles, Gordon A. et al., "Journal Pharmacol," Vol. 72, p. 265, 1941.

*Primary Examiner*—Henry R. Jiles
*Assistant Examiner*—Mildred Crowder
*Attorney, Agent, or Firm*—Mason, Kolehmainen, Rathburn & Wyss

[57]  ABSTRACT

2-[(2-Alkylbenzo[b]furan-3-yl)methyl]-Δ²-imidazolines and salts thereof are peripheral vasoconstrictors useful for the relief of congestion of the nasal mucosa. They are produced from 2-alkylbenzo[b]furans by reaction with HCl and trioxane to form 2-alkyl-3-chloromethylbenzo[b]furans which are converted, by reaction with KCN in the presence of KI, to 2-alkyl-3-cyanomethylbenzo[b]furans which, on treatment with HCl in alcohol, produce the desired imidazoline derivatives.

2 Claims, No Drawings

2[(2-ALKYLBENZO[B] FURAN-3 YL)METHYL]-Δ²-IMIDAZOLINE

This invention relates to heterocyclic compounds and is concerned with novel imidazoline derivatives having pharmacological activity and with a process for preparing the same.

The imidazoline derivatives with which the invention is concerned are 2-[(2-alkylbenzo[b]furan-3-yl)methyl]-Δ²-imidazolines which can be represented by the general formula:

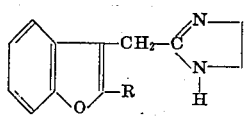
                                            I and the pharmaceutically acceptable acid addition salts thereof, wherein R represents a straight- or branched-chain alkyl group containing from 1 to 4 carbon atoms.

The compounds of formula I may be prepared by reacting, in a lower alcohol, for example ethanol, ethylenediamine with an acid addition salt, for example the hydrochloride, of a lower alkyl, for example ethyl (2-alkylbenzo[b]furan-3-yl)iminoacetate represented by the general formula:

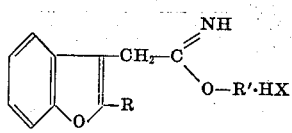
                                            II wherein R' represents a lower alkyl group (i.e., an alkyl group having from 1 to 4 carbon atoms), X represents the anion of a strong acid, preferably of a hydrohalic acid, and R has the same meaning as in formula I, to form the corresponding acid addition salt of the required compound of formula I, which can then be reacted with a base, for example a 10 percent aqueous solution of sodium hydroxide, to obtain the compound of formula I in free base form. If desired the pure base so obtained can then, preferably after purification, be reacted with an organic or inorganic acid to form a different pharmaceutically acceptable acid addition salt.

The compounds represented by formula II may be prepared from the corresponding 2-alkylbenzo[b]furans which are all known compounds. These 2-alkylbenzo[b]furans can be reacted with hydrochloric acid in the presence of trioxane as described by Gaertner in J. Am. Chem. Soc. 74, 5319 (1952). The 2-alkyl-3-chloromethylbenzo[b]furans thus obtained can then be submitted to the action of potassium cyanide in the presence of potassium iodide, as is also described in the same J. Am. Chem. Soc. reference, to provide 2-alkyl-3-cyanomethylbenzo[b]-furans represented by the general formula:

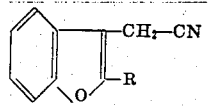
                                            III in which R has the same meaning as in formula I.

The compounds of formula III on being treated with a substantially anhydrous strong acid, preferably an anhydrous hydrohalic acid such as anhydrous hydrochloric acid, in a lower alkanol such as ethanol, yield the compounds represented by formula II, wherein R' is the alkyl radical of the lower alkanol.

The compounds of the invention have been found to possess valuable pharmacological activity. In particular, it has been observed that compounds of the invention exert in the animal body a marked peripheral vasoconstrictor action useful for the relief of congestion of the nasal mucosa.

Animal trials have been carried out to demonstrate the vasoconstrictor activity of the compounds of this application and more particularly to determine the usefulness of these compounds as vasoconstrictors with respect to mucous membrane and skin and to examine their effect on ciliary motility. It is, in fact, important that an agent used to combat states of congestion of the tissues and in particular congestion of the nasal mucosa should have vasoconstrictor properties. Furthermore, in the relief of congestion of the nasal mucosa, it is most desirable that the agent employed should not influence the motile cilia as these help to eliminate secretion and foreign particles and thus serve to clear and protect the respiratory tract.

Vasoconstrictor effect upon mucous membrane

This test was carried out on the anaesthetized dog. It is possible to register, by means of an appropriate apparatus (temperature probe), the temperature of the gingival mucosa of the animal. Any lowering of temperature indicates a corresponding reduction in the blood irrigation of the gums as a result of constriction of the blood vessels.

As soon as 0.01 mg/kg of the preferred compound of the invention, namely, 2-[(2-ethylbenzo[b]furan-3-yl)methyl]-Δ²-imidazoline in the form of its hydrochloride, was administered by intravenous route, a marked and prolonged drop in the temperature of the gingival mucosa was observed, going as far as an average of 0.5°C. for the three groups of dogs used.

Vasoconstrictor effect upon skin

This test enables continuous measurement to be made of the degree of diffusion of a dye in the irritated skin of a rat. 24 hours before the test, the hairs were removed from the lower half of the back of the rats employed. At the start of the test, Trypan Blue was injected intraperitoneally and 10 minutes later a pad impregnated with chloroform was placed for 20 seconds on the hairless part of the back. A gauze pad impregnated with a solution of a compound of the invention (active solution) was then placed on the same part of the body of all the animals except the control group. In the case of the latter, a gauze pad impregnated with the diluent used to prepare the solution containing the compound of the invention was placed on the hairless part of the back. The pad was kept in place for five minutes and then removed. Continuous measurement was then made of the diffusion of the dye by means of an electroreflectometer for one hour both on the treated animals and on the controls. Reduced diffusion of the dye in the treated animals as compared to the controls indicates a corresponding constriction of the blood vessels carrying the dye.

In the test involving the preferred compound of the invention, namely, 2-[(2-ethylbenzo[b]furan-3-yl)methyl]-$\Delta^2$-imidazoline in the form of its hydrochloride, six groups of animals were employed, each comprising ten rats. Five groups were treated with the compound of the invention and one group formed the control group. The following results were obtained:

| Concentration of the active solution ($10^{-2} = 1\%$) | Reduction in % of the diffusion of the dye as compared to the controls |
|---|---|
| $10^{-6}$ | 18 |
| $10^{-5}$ | 22 |
| $10^{-4}$ | 43 |
| $10^{-3}$ | 49 |
| $10^{-2}$ | 65 |

It was furthermore observed that with the concentration of $10^{-2}$ the reduction of diffusion of the dye was still very marked six hours after the application of the active solution.

An identical test was carried out with a recognized vasoconstrictor, namely, 2-(1-naphthylmethyl)imidazoline hydrochloride, also known as naphazoline hydrochloride. In this test, naphazoline hydrochloride proved to be inactive in a concentration as high as 5 percent even after an application lasting 20 minutes.

The vasoconstrictor effect upon skin which causes reduced diffusion of the dye can also be demonstrated by using the same method except that the compound of the invention is first administered by oral route. In this test it was observed that 1 mg/kg of 2-[(2-ethylbenzo[b]furan-3-yl)methyl]-$\Delta^2$-imidazoline hydrochloride produced a 50 percent reduction of diffusion of the dye which lasted at least two hours.

Effect upon ciliary motility

This test was carried out on the healthy guinea pig which was sacrificed without anaesthesia. The trachea was removed and preserved at 37°C. in Locke-Ringer's solution. After the trachea was split open, small fragments of mucosa were removed by lightly scratching the epithelium with a scalpel. The excess of Locke-Ringer's solution was eliminated and the fragments placed in a slide in a drop of solution containing the compound of the invention under study. Observations were made with a microscope. A control test was also carried out in which the behaviour of the cilia was examined in a 5 percent aqueous solution of NaCl which has the effect of maintaining temporarily the activity of the cilia of isolated epithelium. For comparison purposes the same test was performed with naphazoline hydrochloride.

When this test was carried out with 2-[(2-ethylbenzo[b]-furan-3-yl)methyl]-$\Delta^2$-imidazoline hydrochloride the following results were recorded:

| Substance | Number of animals | Concentration in % of the solution | Average duration of ciliary movements |
|---|---|---|---|
| NaCl | 10 | 0.5 | 23 minutes |
| Imidazoline of the invention | 10 | 0.005 | 23 minutes |
| Naphazaline HCl | 7 | 0.1 | 11 minutes |

Acute toxicity tests carried out on the rat by oral route showed that the $LD_{50}$ of the preferred compound of the invention, namely, 2-[(2-ethylbenzo[b]furan-3-yl)methyl]-$\Delta^2$-imidazoline hydrochloride, was 7.0 mg/kg which is several hundred times greater than any concentration which could be required to obtain an optimal vasoconstrictor effect.

It will be appreciated that for therapeutic use the compounds of the invention will normally be administered in the form of a pharmaceutical composition comprising as an essential active ingredient at least one compound of formula I or preferably a pharmaceutically acceptable acid addition salt thereof, in association with a pharmaceutical carrier therefor. The carrier may be a diluent or an excipient of the kind normally employed in the production of medicaments ready for use, such diluent or excipient comprising, for example, one or more of the following substances: distilled water, sodium chloride, benzethonium chloride, potassium phosphate, disodium phosphate dihydrate and potassium chloride.

The composition may be made up in a form suitable for the desired mode of administration which may be by the intranasal route. Advantageously for clinical use, the composition may be made up in a dosage unit form adapted for the desired mode of administration such as, for example, a solution for intranasal administration.

The invention is disclosed in further detail by means of the following examples, which are illustrative of the compounds of this invention and the production thereof.

EXAMPLE 1

2-[(2-Ethylbenzo[b]furan-3-yl)methyl]-$\Delta^2$-imidazoline hydrochloride a. Preparation of 2-ethyl-3-chloromethylbenzo[b]furan In a 3-liter, three-necked flask, equipped with a stirrer, an immersion thermometer and a dropping funnel, 100 g. of trioxane (1.1 mol) and 1.5 liters of concentrated hydrochloric acid were placed. After vigorous stirring to emulsify the reaction mixture, 292 g. (2 mol) of 2-ethylbenzo[b]-furan were added drop-by-drop, while the temperature was maintained between 25° and 30°C. The operation lasted about 45 minutes after which vigorous stirring was continued for 3.5 hours. The contents of the flask were transferred to a 3 liter decanter, the organic layer was separated out and the aqueous layer extracted twice with a total of 600 ml. of petroleum ether (30°/60°). The organic fractions were combined, washed two or three times with water and then with an aqueous solution of sodium bicarbonate until the organic solution became neutral. The organic solution was then dried over anhydrous sodium sulphate, filtered, the solvent eliminated under reduced pressure and finally the residual 2-ethylbenzo[b]furan distilled under high vacuum. The crude residue of 2-ethyl-3-chloromethyl-benzo[b]furan so obtained weighed 345 g., corresponding to a yield of 88.6 percent of theoretical. It boiled at 92–99°C. at 0.4 mm. Hg with slight decomposition.

In a similar manner, the following compounds were prepared:

2-n-propyl-3-chloromethylbenzo[b]furan, b.p. 90°-98°C./0.15 mm. Hg
2-isopropyl-3-chlormethylbenzo[b]furan, b.p. 97°-102°C./0.5 mm.Hg
2-n-butyl-3-chloromethylbenzo[b]furan, b.p. 104°-124°C./0.25 mm.Hg b. Preparation of 2-ethyl-3-cyanomethylbenzo[b]furan In a three-necked, three-liter flask equipped with a stirrer, a dropping funnel and an immersion thermometer, were placed 115 g. (1.77 mol) of potassium cyanide powder, 8 g. of potassium iodide and 300 ml. of dimethylformamide. To this suspension, 344.2 g. (1.77 mol) of 2-ethyl-3-chloromethylbenzo[b]-furan in the crude state were added, while stirring, at a rate such that the temperature of the reaction medium was maintained at 50°C. Stirring was continued for 18 hours at 20°C. after which 1.5 liters of iced water were added. The organic phase was separated out and the aqueous phase extracted three times with 250 ml. of benzene. The organic phases were combined, washed with water and dried over anhydrous sodium sulphate. After filtering, the solvent was eliminated under reduced pressure and the residue purified by fractional distillation. 201.9 g. of 2-ethyl-3-cyanomethylbenzo[b]furan were obtained, boiling at 108°-110°C. under 0.1 mm.Hg. Yield 61.6 percent. The product solidified and melted at about 30°C.

In a similar manner, the following compounds were obtained:

2-n-propyl-3-cyanomethylbenzo[b]furan, b.p. 123°-130°C./0.2 mm.Hg
2-isopropyl-3-cyanomethylbenzo[b]furan, b.p. 104°-107°C./0.2 mm.Hg
2-n-butyl-3-cyanomethylbenzo[b]furan, b.p. 135°-148°C./0.5 mm. Hg c. Preparation of ethyl (2-ethylbenzo[b]furan-3-yl)iminoacetate hydrochloride In a two-liter, three-necked flask equipped with a stirrer, an immersion thermometer and a gas-bubbling tube, 203.5 g. (1.1 mol) of 2-ethyl-3-cyanomethylbenzo[b]furan were placed with 102 ml. of absolute ethanol and 420 ml. of anhydrous ether. The solution was cooled to -15°C. and, while stirring, dry hydrochloric acid gas was bubbled through for 6 hours. Throughout this operation, the temperature was maintained at -5°C. A further 420 ml. of ether were added and the solution was allowed to stand for 12 hours at 20°C. The ethyl (2-ethylbenzo[b]-furan-3-yl)iminoacetate hydrochloride which precipitated was centrifuged out, washed with ether and dried. In this way, 279.5 g. were obtained, melting at about 140°C. (decomposition). Yield: 95 percent.

By the same procedure, the following compounds were prepared from the corresponding 2-alkyl-3-cyanomethylbenzo[b]furan: Ethyl (2-methylbenzo[b]furan-3-yl)iminoacetate hydrochloride, m.p. 118°C. Ethyl (2-n-propylbenzo[b]furan-3-yl)iminoacetate hydrochloride, m.p. 140°C. Ethyl (2-isopropylbenzo[b]furan-3-yl)iminoacetate hydrochloride, m.p. 175°-176°C. Ethyl (2-n-butylbenzo[b]furan-3-yl)iminoacetate hydrochloride, m.p. 122°-124°C.

d. 2-[(2-Ethylbenzo[b]furan-3-yl)methyl]-$\Delta^2$-imidazoline hydrochloride

In a one-liter, three-necked flask equipped with a stirrer and a vertical condenser, 75.5 g. (0.282 mol) of ethyl (2-ethylbenzo[b]furan-3-yl)iminoacetate hydrochloride were placed with 400 ml. of ethanol. While stirring, a solution of 16.9 g. (0.282 mol) of ethylenediamine in 100 ml. of ethanol was added. The solution was stirred for one hour at 20°C. and then refluxed for 4 hours. The solvent was evaporated under reduced pressure and the residue which solidified on trituration with anhydrous ether was centrifuged and recrystallized from isopropyl alcohol and then from ethanol. In this way, 44.8 g. of 2-[(2-ethylbenzo[b]furan-3-yl)methyl]-$\Delta^2$-imidazoline hydrochloride were obtained, melting at 193°-197°C. Yield: 60 percent.

By the same procedure, the following compounds were prepared from the corresponding ethyl (2-alkylbenzo[b]furan-3-yl)-iminoacetate hydrochlorides:

2-[(2-methylbenzo[b]furan-3-yl)methyl]-$\Delta^2$-imidazoline hydrochloride, m.p. 275°-278°C. 2-[(2-n-propylbenzo[b]furan-3-yl)methyl]-$\Delta^2$-imidazoline hydrochloride. m.p. 171°-173°C. 2-[(2-isopropylbenzo[b]furan-3-yl)methyl]-$\Delta^2$-imidazoline hydrochloride, m.p. 208°-211°C. 2-[(2-n-butylbenzo[b]furan-3-yl)methyl]-$\Delta^2$-imidazoline hydrochloride, m.p. 167°-169°C.

EXAMPLE 2

2-[(2-Ethylbenzo[b]furan-3-yl)methyl]-$\Delta^2$-imidazoline 13.3 g. of 2-[(2-ethylbenzo[b]furan-3-yl)methyl]-$\Delta^2$-imidazoline hydrochloride prepared in the manner described in Example 1 were dissolved in 50 ml. of water and the resulting solution was made alkaline with 20 ml. of a 10 percent aqueous solution of sodium hydroxide. The precipitate which formed was separated out by centrifuging and taken up in ether. The solution so obtained was dried over anhydrous sodium sulphate, filtered and the ether eliminated. The residue obtained was purified by crystallization from a mixture of n-hexane and benzene. In this way, 10.26 g. of the free base 2-[(2-ethylbenzo[b]furan-3-yl)methyl]-$\Delta^2$-imidazoline were obtained, melting at 118°-120°C. Yield: 90 percent.

The free base obtained in this manner was converted into the oxalate, sulphate and hydrobromide salts as hereinafter described.

Oxalate 2.28 g. of the 2-[(2-ethylbenzo[b]furan-3-yl)methyl]-$\Delta^2$-imidazoline were dissolved in anhydrous ethyl ether and the resulting solution acidified with an ethereal solution of anhydrous oxalic acid. The oxalate which precipitated was separated out by centrifuging and purified by crystallization from methyl alcohol. In this way, 1.98 g. of 2-[(2-ethylbenzo[b]-furan-3-yl)methyl]-$\Delta^2$-imidazoline oxalate were obtained, melting at 230°-233°C. with decomposition. Yield: 62 percent.

Sulphate 2.28 g. of the imidazoline free base were dissolved in anhydrous ethyl ether and the solution acidified with an ethereal solution of concentrated sulphuric acid. The resulting crude sulphate salt was purified by crystallization from isopropanol to give 2.3 g. of 2-[(2- ethylbenzo[b]furan-3-yl)methyl]-Δ²-imidazoline sulphate melting at 176°-179°C. Yield: 71 percent.

Hydrobromide 2.28 g. of the imidazoline free base were dissolved in anhydrous ethyl ether and the resulting solution was then acidified by bubbling anhydrous hydrobromic acid through it. The resulting crude hydrobromide salt was purified by crystallization from isopropanol to give 1.70 g. of 2-[(2-ethylbenzo[b]furan-3-yl)methyl]-Δ²-imidazoline hydrobromide, melting at 203°-206°C. Yield: 55 percent.

EXAMPLE 3

An 0.0025 percent solution for intranasal administration was prepared in accordance with known pharmaceutical techniques from the following ingredients:

| Ingredient | mg. |
|---|---|
| 2-[(2-ethylbenzo[b]furan-3-yl)methyl]-Δ²-imidazoline hydrochloride | 2.5 |
| Sodium chloride | 750 |
| Potassium chloride | 100 |
| Benzethonium chloride | 10 |
| Potassium phosphate | 45 |
| Disodium phosphate dihydrate | 0.6 |
| Distilled water | q.s. to give 100 ml. |

EXAMPLE 4

An 0.005 percent solution for intranasal administration was prepared in accordance with known pharmaceutical techniques from the following ingredients:

| Ingredient | mg |
|---|---|
| 2-[(2-ethylbenzo[b]furan-3-yl)methyl]-Δ²-imidazoline hydrochloride | 5 |
| Sodium chloride | 750 |
| Potassium chloride | 100 |
| Benzethonium chloride | 10 |
| Potassium phosphate | 45 |
| Disodium phosphate dihydrate | 0.6 |
| Distilled water | q.s. to give 100 ml. |

We claim:

1. An imidazoline compound corresponding to the general formula:

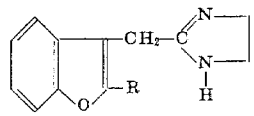

and the pharmaceutically acceptable acid addition salts thereof, wherein R represents a straight- or branched-chain alkyl group containing from one to four carbon atoms.

2. A compound as defined by claim 1 wherein R is ethyl.

* * * * *